(12) United States Patent
Zafred et al.

(10) Patent No.: US 6,221,522 B1
(45) Date of Patent: Apr. 24, 2001

(54) OPEN END PROTECTION FOR SOLID OXIDE FUEL CELLS

(75) Inventors: Paolo R. Zafred, Murrysville; Jeffrey T. Dederer, Valencia; Gregory W. Tomlins, Pittsburgh; James M. Toms, Irwin; George R. Folser, Lower Burrell; Douglas S. Schmidt, Pittsburgh; Prabhakar Singh, Export; Charles A. Hager, Zelienople, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/393,560

(22) Filed: Sep. 10, 1999

(51) Int. Cl.$^7$ ........................................ H01M 8/10
(52) U.S. Cl. ................... 429/31; 429/27; 429/28; 429/34
(58) Field of Search ................... 429/27, 31, 30, 429/34, 37, 28

(56) References Cited

U.S. PATENT DOCUMENTS

| 4,395,468 | 7/1983 | Isenberg ................... 429/31 |
| 4,664,986 | 5/1987 | Draper et al. ............. 429/26 |
| 4,874,678 | 10/1989 | Reichner ................... 429/30 |
| 5,244,752 | * 9/1993 | Zymboly ................... 429/31 |
| 5,527,631 | * 6/1996 | Singh et al. ............... 429/20 |
| 5,573,867 | 11/1996 | Zafred et al. .............. 429/17 |
| 5,595,833 | * 1/1997 | Gardner et al. ............ 429/19 |
| 5,733,675 | * 3/1998 | Dederer et al. ............ 429/19 |

\* cited by examiner

Primary Examiner—Stephen Kalafut
Assistant Examiner—Raymond Alejandro

(57) ABSTRACT

A solid oxide fuel cell (40) having a closed end (44) and an open end (42) operates in a fuel cell generator (10) where the fuel cell open end (42) of each fuel cell contains a sleeve (60, 64) fitted over the open end (42), where the sleeve (60, 64) extends beyond the open end (42) of the fuel cell (40) to prevent degradation of the interior air electrode of the fuel cell by fuel gas during operation of the generator (10).

14 Claims, 2 Drawing Sheets

OPEN END PROTECTION FOR SOLID OXIDE FUEL CELLS

GOVERNMENT CONTRACT

The Government of the United States of America has rights in this invention, pursuant to Contract No. DE-FC26-99FT-34139 with the United States Department of Energy.

FIELD OF THE INVENTION

This invention relates to increasing the life of tubular solid oxide fuel cells by increasing the resistance to reduction of the air electrode cathode at the open end of the cells, especially during pressurized operation.

BACKGROUND OF THE INVENTION

Operation of tubular solid oxide fuel cells in a fuel cell generator is well known in the art, and taught, for example, in U.S. Pat. Nos. 4,395,468, 4,664,986 AND 5,573,867 (Isenberg, Draper et al., and Zafred, et al., respectively). There, the generator is divided into an oxidant inlet chamber and a fuel inlet chamber, separated by a combustion zone or air pre-heating chamber. Tubular solid oxide electrolyte fuel cells extend from the combustion zone or air pre-heating chamber and through the fuel chamber. The term "tubular" as used here is defined as meaning circular, as well as flattened configurations containing a plurality of interior oxidant passages, as taught in U.S. Pat. No. 4,874,678 (Reichner). The tubular solid oxide fuel cells have a closed end in the fuel chamber and an open end within the combustion zone or air pre-heating chamber, where depleted oxidant passes out of the fuel cell open end to combust with depleted fuel, to pre-heat oxidant feed tubes and feed oxidant passing through those feed tubes. The fuel cells have an outer electrode contacting flowing fuel, the "fuel electrode" anode, and an inner support electrode contacting flowing oxidant, usually air, the "air electrode" cathode, separated by a solid oxide ceramic ionically conductive electrolyte, and operate from about 900° C. to 1300° C. The air electrode is usually made of a doped-$LaMnO_3$.

Solid oxide fuel cell (SOFC) systems currently being developed for power generation applications, offer high efficiency, negligible stack pollution and ease of operation by utilization of many types of fuels. Several SOFC power generation systems capable of operating on gaseous and liquid hydrocarbon fuels have been fabricated and field tested to evaluate the performance and long term stability of cells and system components. The integration and operation of SOFC systems with gas turbines/generators in a pressurized mode offers the potential of more efficient operation. Operating the SOFC generator under pressurized conditions is beneficial in the reduction of cathode-side polarization losses, however cell operation under pressure may increase the risks involved in upset and transient conditions.

If balanced pressure is not maintained on both anode and cathode sides of the cell, gas flow will occur, between sides, releasing oxygen to the anode side or fuel gas to the cathode on the inside of the cell. The introduction of fuel gas to the cathode causes reduction of the doped-$LaMnO_3$ with a concurrent volume change that mechanically stresses the material which can lead to cracking and cell failure. Recognizing that a fuel cell generator can have hundreds of separate fuel cells, making up most of the generator, this can be a serious problem. The main means to control such cracking problem was to attempt maintenance of standard operating conditions, whereby fuel gas was isolated from the inside of the cell. This, however, does not solve problems during upset conditions when a sudden depressurization event occurs. Thus, there is a need for a permanent solution to fuel incursion into the open end of the fuel cell to degrade the interior air electrode. The main object of the invention is to protect the interior air electrode from fuel contact and degradation during operation and under upset conditions by providing a thermally shock resistant sleeve.

SUMMARY OF THE INVENTION

This object is accomplished by providing a solid oxide fuel cell having an exterior fuel electrode and an interior air electrode, with solid oxide electrolyte therebetween, the fuel cell having an open end and a closed end, where the open end contains a sleeve fitted over the solid oxide fuel cell at the open end, where the sleeve extends beyond the open end of the fuel cell and contains a metal oxide reactive with gaseous fuel. The sleeve preferably comprises or is coated with $ZrO_2$, $Al_2O_3$, NiO, $SiO_2$ and their mixtures and extends beyond the open end of the fuel cell by at least one half of the outside diameter of the fuel cell, preferably, but no more than, three times the outside diameter of the fuel cell. A plurality of these sleeved fuel cells can be disposed in the generator chamber of a fuel cell and operated in an environment of gaseous oxidant, such as air, or gaseous fuel, such as natural gas.

The invention also resides in a high temperature, solid electrolyte fuel cell generator, comprising: (a) housing means defining a plurality of chambers including a fuel inlet chamber and an air pre-heating chamber; (b) a plurality of elongated fuel cells having an interior air electrode and an exterior fuel electrode, and an active length with a closed end disposed in the fuel inlet, and an open end disposed in the air pre-heating chamber, said open end subject to fuel gas entry during interrupted operation of the generator; (c) means for flowing a gaseous oxidant through the fuel cells and into the air pre-heating chamber; and (d) means for flowing a gaseous fuel about the fuel cells in the fuel inlet chamber; where the improvement comprises that the open end of each fuel cell contains a sleeve fitted over said open end, where the sleeve extends beyond said open end and contains a metal oxide reactive with said gaseous fuel and said metal oxide is effective to react with the gaseous fuel to prevent reduction of the interior air electrode.

The function of the sleeve is to increase the path length for diffusion and flow of the fuel gas into the inside of the cathode tube in the event of excess fuel leakage or rapid depressurization event. The sleeve ensures that any combustion of fuel and air that might occur typically at the end of the cell instead occurs at the end of the sleeve, which is more resistant to thermal shock and, even if it cracks, does not affect the cell. Also, by utilization of a metal oxide coating, the sleeve is capable of decreasing the amount of fuel gas that reaches the cathode through a cathalitic reduction of the metal oxide coating.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENT

Figure 1:
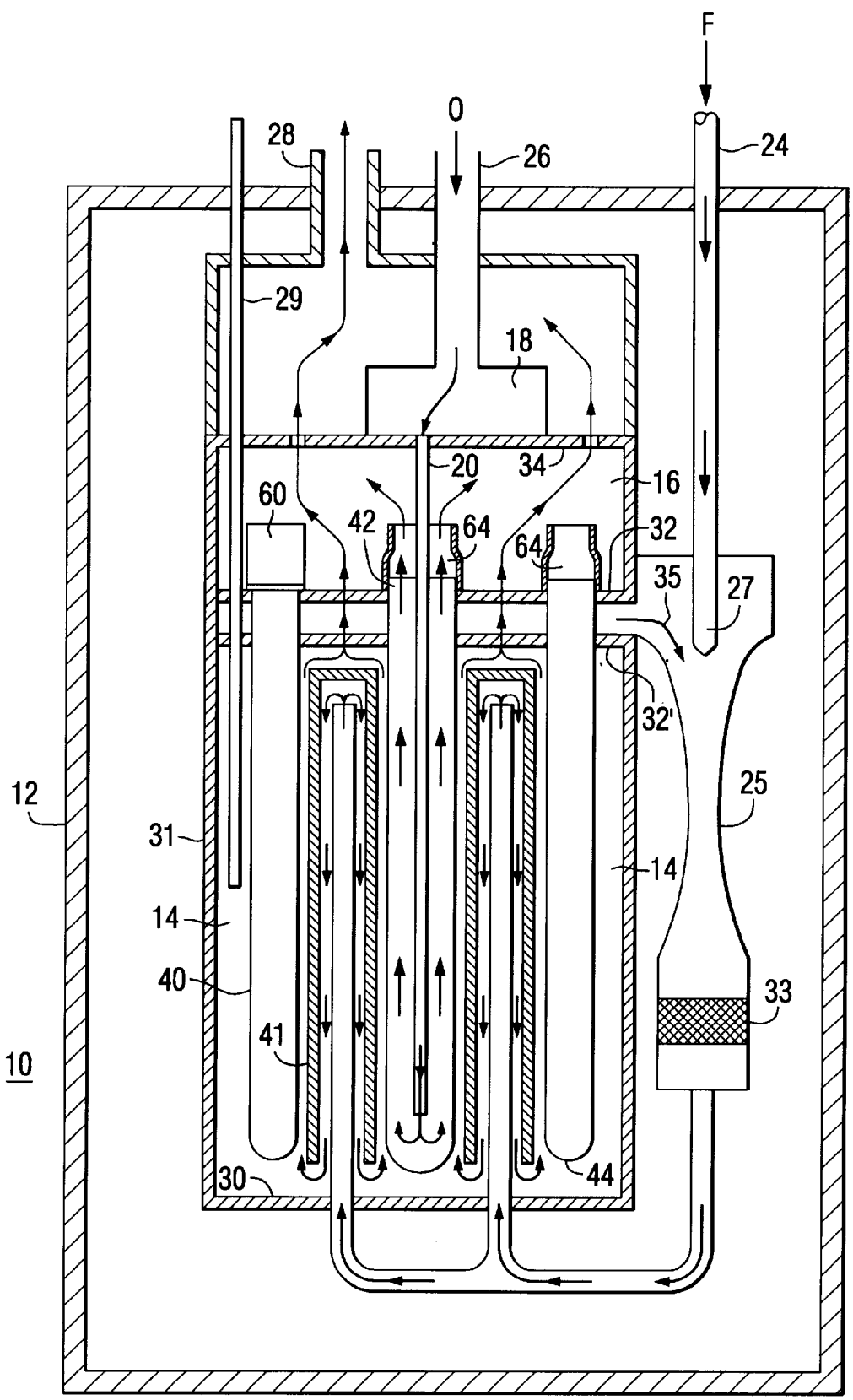
FIG. 1 is a simplified, idealized view, partially in section of a generator containing the fuel cells capped with the sleeves of this invention.

Referring now to FIG. 1 there is shown a fuel cell generator 10 including a gas-tight outer, pressure housing 12. The housing 12 surrounds a plurality of chambers, including a fuel inlet chamber 14 and a combustion zone or air pre-heating chamber 16. An oxidant inlet chamber 18 is also contained within the housing 12. Alternatively, other means for manifolding an oxidant into feed tubes 20 can be utilized. The housing 12 is preferably comprised of alloy steel, and lined throughout with a thermal insulation (not shown) such as low density fibrous alumina insulation. Penetrating the housing 12 and insulation is a fuel inlet port, shown here as 24, an air inlet port, shown here as 26, and an exhaust outlet port 28, as well as ports for electrical leads 29 (not shown).

The fuel inlet chamber 14 extends between an end wall 30 of the fuel cell stack liner 31 and porous barriers 32 and 32'. The air pre-heating chamber 16 extends between one porous barrier 32 and a tube support structure such as a tube sheet 34. The porous barrier 32, is designed to allow flow diffusion between the fuel inlet chamber 14, operating at an approximate pressure slightly above atmospheric, and the air pre-heating chamber 16, operating at a slightly lower pressure. The generator 10 is shown in a vertical orientation.

High temperature, tubular, solid oxide electrolyte fuel cells 40 are contained within the fuel inlet chamber 14 as are fuel reformer dividers 41. In the Figure, the central fuel cell is enlarged to show detail. The cells have open ends 42 in the pre-heating chamber 16, and closed end 44 in the fuel inlet chamber 14. The fuel cells are preferably tubular, including a solid oxide electrolyte sandwiched between the air and fuel electrodes. Each cell includes an electrochemically active length contained within the fuel inlet chamber 14. Each individual cell generates approximately one volt (in open circuit), and a plurality are electrically interconnected, preferably in a series-parallel square array, as is described in detail in U.S. Pat. No. 4,395,468, herein incorporated by reference.

The feed tubes 20 are preferably loosely supported at one end in the tube sheet 34, as shown in FIG. 1 for the central fuel cell. The tube sheet 34 is preferably Inconel (or Ni alloy material), with bores that fit loosely about the feed tubes 20 to allow free thermal expansion. The feed tubes 20 are preferably comprised of alumina, and the tube sheet is protected with an insulation layer such as low density alumina (not shown). A limited leakage of oxidant is acceptable.

The feed tubes 20 extend from the tube sheet 34 into the open end 42 of the fuel cells 40, where a single conduit 20 is coaxially engaged to a single fuel cell. Each conduit 20 extends to the closed end 44 of the cell. The actual support structure of the cell stack may be determined based upon the operational orientation of the generator. The conduits 20 are open ended and spaced from the closed end 44 of the fuel cell. The porous barriers 32 and 32', which allows a throughput of depleted fuel, are preferably a porous ceramic baffle, such as one comprised of fibrous alumina board, or ceramic plate segments with porous inserts such as ceramic wool plugs, surrounding each fuel cell 40.

During operation an oxidant such as air 0 enters the inlet chamber 18 through inlet port 26. The chamber 18 functions as an inlet manifold for the individual conduits 20. Preheated air enters the conduits at a temperature of approximately 600° C. to 700° C. The air flows within the feed tubes, through the preheating chamber 16, where it is further heated to a temperature of approximately 900° C. The air then flows through the length of the conduit, being further heated to approximately 1000° C., and is discharged through the bottom opening into the fuel cell 40. The air within the fuel cell electrochemically reacts at the fuel cell cathode along the active length, depleting somewhat in oxygen content as it approaches the open end 42 of the cell. The depleted air is discharged into the combustion product or preheating chamber 16 to form the exhaust stream leaving the generator via the exhaust outlet port 28.

During operation, fuel F, such as hydrogen or a mixture of carbon monoxide with hydrogen, flows into the fuel chamber 14 through fuel inlet port 24, also passing into a pre-reforming chamber 25 with a reforming element 33, via an ejector 27, where reacted fuel 35 may be added through a recirculation plenum between barriers 32 and 32'. The fuel flows over and about the exterior of the fuel cells, electrochemically reacting at the anode. The fuel depletes as it approaches the porous barrier 32. The depleted fuel, containing approximately five percent to fifteen percent of its initial fuel content, diffuses through the barriers 32 and 32' and into the air pre-heating chamber 16. Thus, fuel passes/contacts the open end of 42 of the fuel cell without sleeves 60 or 64 being present. In unsettled pressure situations or in air blockage as a result of loss of air flow, fuel may penetrate into the open end 42 and pass deep into the interior of the fuel cell 40 in reverse flow.

The combustion products, including oxygen depleted air and fuel, along with any air leaking into the preheating chamber 16 through the tube sheet 34, directly react exothermically. The heat of this reaction, which completely combusts the fuel, along with the sensible heat of the depleted fuel and air, are utilized to preheat the incoming air through conduits 20. The exhaust is discharged through exhaust outlet port 28 at a temperature of approximately 900° C. The generator described herein can operate either in a non-pressurized mode or in a pressurized mode in conjunction with a gas turbine generator.

Figure 2B:
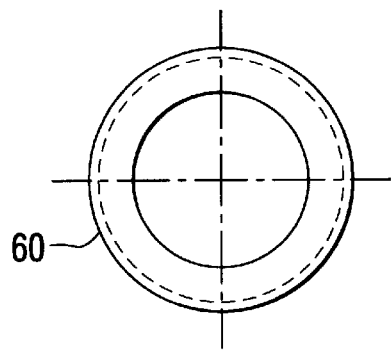
FIG. 2(b) is an end view of the sleeve of FIG. 2(a)
Figure 3B:
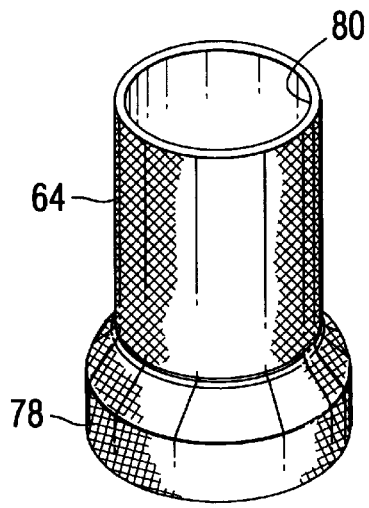
FIG. 3(b) is a three dimensional view of the sleeve of FIG. 3(a).
Figure 2A:
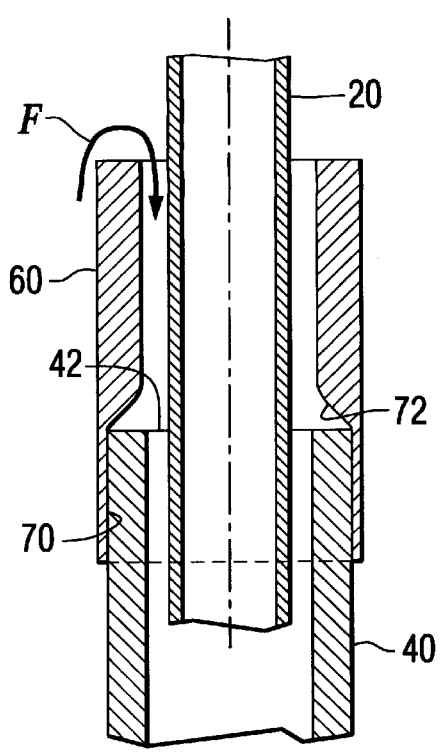
FIG. 2(a) is a cross-sectional view of one type sleeve useful in this invention, attached to the open end of a fuel cell.
Figure 3A:
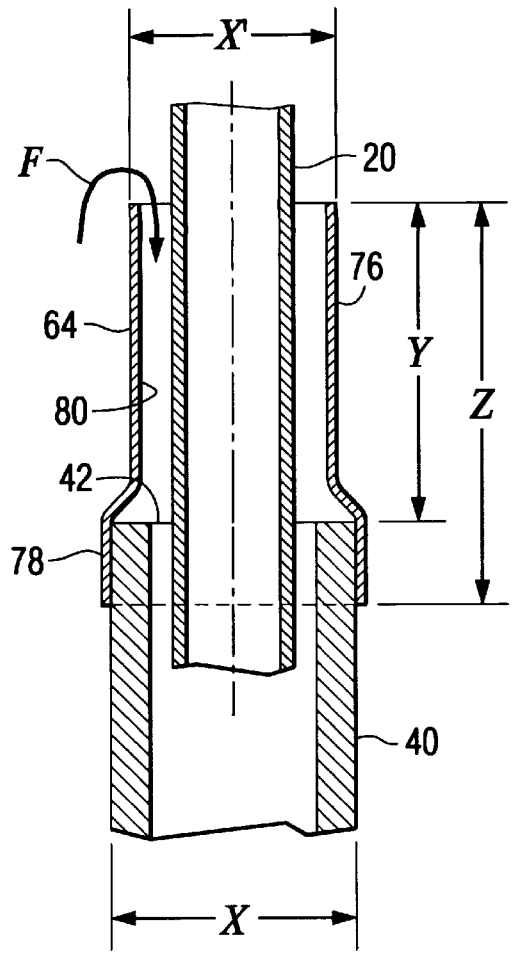
FIG. 3(a) is a cross-sectional view of another type sleeve useful in this invention, attached to the open end of a fuel cell.

As shown in FIG. 1, sleeves 60 or 64 are attached over the open end 42 of the fuel cells 40, such that the air electrode surface does not come in contact with the combusted fuel gas and remains exposed to the air. In the event that the air flow is interrupted and fuel flow continues for a short time (reaction time for the valve actuation), the metal oxide of the sleeve structure or the metal oxide coating supported on the sleeve provides oxygen for the combustion of the fuel and protects the air electrode from reducing. Ceramic sleeves consisting of NiO coated, braided alumina ($Al_2O_3$) fibers and injection molded $ZrO_2$ have been fabricated and thermally tested under normal and simulated generator upset conditions. Post test examinations show that the sleeves 60 and 64 protect the ends of the fuel cells from cracking and the presence of metal oxide in the sleeves oxidize the fuel and reduce the open end temperature of the fuel cell. FIGS. 2(a) and 3(a) show how fuel F might enter the sleeve—fuel cell combination at unbalanced periods of operation.

The sleeve 60 or 64 additionally includes the following characteristics: (1) resistance to high temperature environment (up to 1000° C. at normal operating conditions and up to 1200° C.–1300° C. in a hydrogen-burning atmosphere); (2) resistance to both oxidizing and reducing atmosphere, (3) excellent electrical insulation and chemical resistance, (4) adaptation to varying open cell geometry (ovality, edge irregularities, local thinning), and (5) tolerance to severe thermal gradients and shock.

The invention will now be further clarified by the following non-limiting example:

EXAMPLE

Sleeves of two types were fabricated and tested in SOFC applications. The first type was a rigid sleeve fabricated from injection-molded zirconia ($ZrO_2$). The shape of the sleeve was designed to slide over the open end of the fuel cell. The sleeve was fastened to the cell using aluminum phosphate cement. The sleeve is shown in FIG. 1 as sleeve 60, and is shown in more detail in FIG. 2(a) and FIG. 2(b). The second type was a flexible, thin sleeve fabricated using woven yarn made from high-purity continuous alumina ($Al_2O_3$) fiber. The alumina fiber was selected because of its excellent mechanical properties, including high tensile strength and high tensile modulus which makes it very suitable for textile braiding processes. Fused silica ($SiO_2$) and moderate purity alumina are other possibilities. The braided sleeve was cut to length, formed around a specially shaped Teflon mandrel and subsequently coated with a hardening cement. The cement was synthesized from a mixture of one part aluminum phosphate, two parts alumina and one part deionized water. To cure the cement on the sleeve, the as-covered sleeve was heated in a microwave oven for 30 seconds. After curing, the sleeve was coated with a slurry made of three parts metal oxide powder such as nickel oxide; one part alumina, two parts of aluminum phosphate and two parts deionized water. After coating with the metal oxide slurry, the sleeve was cured for 30 seconds in a microwave oven. The braided-alumina sleeve is shown as sleeve 64 in FIG. 1, and is shown in more detail in FIG. 3(a) and FIG. 3(b). A final, high temperature curing step was performed by heating the braided sleeve from room temperature to 900° C. in 4 to 6 hours, with an 8 hour soak at 900° C. followed by furnace cooling. The sleeves were trimmed to the desired size with a diamond cutoff wheel.

Sleeve 60, which is a simple, straight-side tube with an interior portion thinned down at 70 and with a 40° to 50° bevel at 72, has the advantage that it is close to being 100% dense, so fuel cannot penetrate its sides. It is fabricated by utilizing an injection molding process, which is more costly than the method used for sleeve 64. Sleeve 64 requires several fabricating steps and is flexible due to its thinness. Sleeve 64 also has a staged/stepped tubular design with uniform thickness with a decreasing outside diameter as it extends from the fuel cell, so that it can fit close to the oxidant feed conduit 20, as shown in FIG. 1 and FIG. 3(a). Sleeve 64 has a smaller diameter at its throat portion 76 than at its mounting portion 78 next to the open end of the fuel cell to accommodate the transition from cell outer diameter to inner diameter. The throat portion 76 can be made so that the distance between the outside of the oxidant conduit 20 and the inside of the sleeve 80 would in itself help restrict fuel flow in unsettled pressure conditions.

As an example of dimensions, sleeve 64, for example, extends beyond the open end of the fuel cell 42 the length Y, while the outside diameter of the fuel cell is shown as X in FIG. 3(a). It is important that Y be long enough to help deter fuel entry but not so long that exiting depleted oxidant cannot fully combust with most of the depleted fuel to heat feed oxidant in oxidant conduits 20, shown in partial cross-section in FIGS. 2(a) and 3(a). Therefore, Y must be at least ½ X, but preferably no more than 3 X. In the sleeve samples 64: X=22.23 mm; Y=about 28.65 mm; Z=35 mm and X'=17.2 mm, with an outer sleeve thickness of 0.38 mm, although it could be made much thicker to reduce its fragile nature.

Both types of sleeves were tested by cementing the sleeve to the open end of a 50 cm long SOFC fuel cell. During normal operation in separate tests, both types of sleeves showed excellent performance. The sleeve tests were then extended to include upset conditions. In the first test, a $ZrO_2$ sleeved-cell, type 60, was matched with an unsleeved cell. To test the worst-case scenario, the air flow through the cathode tube was halted for 5, 8, 10 and 20 seconds while the fuel flow was increased to 1200 cubic cm/min $H_2$ and the cells were operated at open circuit. Up to 20 seconds without air flow caused no degradation. After the cells recovered, the air was finally stopped for 30 seconds, after which visual examination of the cells showed some cracking at the open end of the unsleeved cell. Post-test examination of the unsleeved cell showed a damaged region, approximately 25 mm long, with several small cracks, at the open end, while the cell with the $ZrO_2$ sleeve was undamaged.

The same set of tests were conducted on a second pair of cells—one with metal oxide-coated, alumina braided sleeve, type 64, and the second cell with no sleeve. Again, the cells both survived 5, 8, 10 and 20 seconds without air, and the unsleeved cell failed (cracked) after 30 seconds without air. Post-test examination revealed 45 mm of cracking at the open end of the unsleeved cell and no damage in the cell with the braided alumina sleeve. This series of tests in halting the air flow provided conclusive evidence that the sleeve has a significant effect in increasing the cells durability during upset conditions when the fuel flow continues and the air flow is halted.

After these tests, both types of sleeves were fabricated and used in an experimental pressurized bundle test re-build. Preliminary results indicate that both types of sleeves performed well during testing. Similar results should result from sleeves made to fit elongated fuel cells.

Since numerous changes may be made in the dimensions and composition of the above-described generator, fuel cells and sleeves without departing from the spirit and scope thereof, it is intended that all matter contained in the foregoing description be interpreted as illustrative and not in a limiting sense.

What is claimed is:

1. A solid oxide fuel cell having an exterior fuel electrode and an interior air electrode, with solid oxide electrolyte therebetween, the fuel cell having an open end and a closed end, where the open end contains a sleeve fitted over the solid oxide fuel cell at the open end, where the sleeve extends beyond the open end of the fuel cell.

2. The solid oxide fuel cell of claim 1, where the sleeve contains a metal oxide reactive with gaseous fuel.

3. The solid oxide fuel cell of claim 1, where the sleeve contains metal oxide selected from the group consisting of $ZrO_2$, $Al_2O_3$, NiO, $SiO_2$, and their mixtures, and the sleeve extends beyond the open end of the fuel cell by at least one-half of the outside diameter of the fuel cell.

4. The solid oxide fuel cell of claim 1, where the sleeve extends beyond the open end of the fuel cell by from one-half to three times the outside diameter of the fuel cell.

5. The solid oxide fuel cell of claim 1, where the sleeve has a configuration selected from a straight side tube comprising $ZrO_2$, and a tube having a decreasing outside diameter comprising NiO with woven fiber of $Al_2O_3$ coated with metal oxide slurry.

6. The solid oxide fuel cell of claim 1, where the sleeve is cemented to the fuel cell.

7. A high temperature, solid electrolyte fuel cell generator, comprising:
   a) housing means defining a plurality of chambers including a fuel inlet chamber and an air pre-heating chamber;
   b) a plurality of elongated fuel cells having an interior air electrode and an exterior fuel electrode, and an active length with a closed end disposed in the fuel inlet chamber, and an open end disposed in the air pre-heating chamber, said open end subject to fuel gas entry during interrupted operation of the generator;
   c) means for flowing a gaseous oxidant through the fuel cells and into the air pre-heating chamber; and
   d) means for flowing a gaseous fuel about the fuel cells in the fuel inlet chamber;

where the open end of each fuel cell contains a sleeve fitted over said open end, where the sleeve extends beyond said open end to prevent reduction of the interior air electrode.

8. The fuel cell generator of claim 7, where the generator operates in a pressurized mode, the sleeve contains a metal oxide reactive with said gaseous fuel and said metal oxide is effective to react with the gaseous fuel, and the length of the sleeve extension is effective to prevent fuel gas from entering the fuel cell open end.

9. The fuel cell generator of claim 7, where the sleeve contains metal oxide selected from the group consisting of $ZrO_2$, $Al_2O_3$, $NiO$, $SiO_2$, and their mixtures.

10. The fuel cell generator of claim 7, where the sleeve extends beyond the open end of the fuel cell by at least one-half of the outside diameter of the fuel cell.

11. The fuel cell generator of claim 7, where the sleeve extends beyond the open end of the fuel cell by from one-half to three times the outside diameter of the fuel cell.

12. The fuel cell generator of claim 7, where the sleeve has a configuration selected from a straight side tube comprising $ZrO_2$, and a tube having a decreasing outside diameter comprising $NiO$ with woven fiber of $Al_2O_3$ coated with metal oxide slurry.

13. The fuel cell generator of claim 7, where the sleeve is cemented to the fuel cell.

14. The fuel cell generator of claim 7, operating in a pressurized mode with gaseous oxidant and gaseous fuel as part of a system also containing a gas turbine generator.

* * * * *